US008662459B2

(12) United States Patent
Truitt

(10) Patent No.: US 8,662,459 B2
(45) Date of Patent: Mar. 4, 2014

(54) BAG SUPPORTING APPARATUS

(76) Inventor: John Truitt, Pittsburg, TX (US)

( * ) Notice: Subject to any disclaimer, the term of this patent is extended or adjusted under 35 U.S.C. 154(b) by 17 days.

(21) Appl. No.: 13/462,292

(22) Filed: May 2, 2012

(65) Prior Publication Data

US 2012/0248262 A1 Oct. 4, 2012

Related U.S. Application Data

(63) Continuation-in-part of application No. 12/870,741, filed on Aug. 27, 2010, now Pat. No. 8,360,374.

(51) Int. Cl.
*F16M 11/38* (2006.01)

(52) U.S. Cl.
USPC ........ 248/171; 135/120.2; 135/131; 135/144; 135/145; 135/147; 135/151; 297/410; 297/338; 297/344.12; 248/101; 248/124.2; 248/97; 248/99; 248/95

(58) Field of Classification Search
USPC .................... 248/171, 95, 97, 99, 101, 124.2; 135/120.2
See application file for complete search history.

(56) References Cited

U.S. PATENT DOCUMENTS

| | | | | |
|---|---|---|---|---|
| 1,446,346 A * | 2/1923 | Hanson | 248/97 |
| 2,044,517 A * | 6/1936 | Thomas | 220/9.3 |
| 2,638,399 A * | 5/1953 | Seymour | 312/297 |
| 2,823,923 A * | 2/1958 | Marquardt | 280/654 |
| 3,106,409 A * | 10/1963 | Berlin | 280/39 |
| 3,140,070 A * | 7/1964 | Doebele | 248/97 |
| 3,354,596 A * | 11/1967 | Schafer | 52/646 |
| 3,410,328 A * | 11/1968 | Sasai | 220/9.2 |
| 4,805,857 A * | 2/1989 | Travis | 248/97 |
| 5,234,116 A * | 8/1993 | Kristinsson et al. | 211/201 |
| 5,405,018 A | 4/1995 | Anthrop, Jr. | |
| 5,507,577 A * | 4/1996 | Fowler | 383/7 |
| 5,794,792 A | 8/1998 | Convertino | |
| 6,367,492 B1 | 4/2002 | Brown | |
| 6,513,674 B1 * | 2/2003 | Kajikawa et al. | 220/572 |
| 6,557,567 B2 | 5/2003 | Mood | |
| 6,640,982 B1 | 11/2003 | Bjerke | |
| 6,983,754 B1 | 1/2006 | Anderson et al. | |
| 7,475,785 B1 * | 1/2009 | Kidd | 211/85.15 |
| 2007/0295882 A1 * | 12/2007 | Catton | 248/588 |
| 2012/0049014 A1 | 3/2012 | Truitt | |

* cited by examiner

*Primary Examiner* — Daniel J Troy
*Assistant Examiner* — Asha Puttaiah
(74) *Attorney, Agent, or Firm* — Egbert Law Offices, PLLC

(57) ABSTRACT

A bag support apparatus has a first support member, a first arm slidably received in the first support member so as to be movable between a retracted position and an extended position, a second support member, and a second arm slidably received in the second support member so as to be movable between a retracted position and an extended position. The first arm is linked to the second arm such that a movement of the first support member toward the second support member causes the first and second arms to move toward the retracted position and such that a movement of the first support member away from the second support member causes and first and second arms to move to the extended position. A scissor mechanism is linked to the first and second support members and to the first and second arms.

17 Claims, 3 Drawing Sheets

BAG SUPPORTING APPARATUS

CROSS-REFERENCE TO RELATED APPLICATIONS

The present application is a Continuation-in-part of U.S. patent application Ser. No. 12/870,741, filed on Aug. 27, 2010, and entitled "Adjustable Frame to Support Flexible Bodies", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus that are used to support flexible bags thereon. More particularly, the present invention relates to bag supporting apparatus whereby a flexible bag can be placed thereon so as to be washed in a conventional dishwasher. More particularly, the present invention relates to bag supporting apparatus which allows various sizes of bags to be securely supported in an open position.

2. Description of Related Art Including Information Disclosed Under 37 CFR 1.97 and 37 CFR 1.98

Classic food storage bags have enjoyed widespread popularity. These bags are typically made from clear, tough plastic and a zip-type closure or seal mechanism at the bag mouth for sealing the bag in a fluid-tight manner. Over the years, these bags have become increasing durable, to the point where they are now able to be used on multiple occasions. However, such bags continue to be marketed and used as single use "disposable" storage bags.

The disposability of the bags provides a source of convenience for bag users. Unfortunately, the bags can be costly and their disposal contributes large amounts of solid waste to already strained landfills. Further, these bags are made from petroleum-based plastics, and their manufacture further depletes the earth's finite oil supply. Additionally, these bags will only degrade over an extended period of time of around 500 years. As such, the accumulation of such disposable bags in landfills presents an environmental problem for generations to follow.

The main cause of the premature disposal of these plastic bags is the lack of an effective and convenient apparatus for washing, rinsing, and drying the bags after they have been used for storage of food or the like. One prior approach is to manually wash the interior of the bag. In addition to being time-consuming, unpleasant and often ineffective, the lack of a suitable support for the bags allows the bag walls to collapse together and trap moisture in the bag interior.

Additionally, users of such disposable bags will often have various sizes of bags. These bags can be in the nature of a quart bag up to a gallon bag. Prior attempts to provide such disposable bag washing devices have only been able to accommodate a single size of bags and cannot easily and effectively accommodate a range of bag sizes. As such, a need has developed whereby a bag supporting apparatus can be used for supporting various sizes of bags in a desired open position.

In the past, various patents have issued relating to such bag support apparatus. For example, U.S. Pat. No. 5,405,018, issued on Apr. 11, 1995 to Anthrop, Jr., describes a dishwasher attachment for supporting a freezer bag. The attachment includes a hose and a clip. The hose is engageable with any of two of the prongs of the dishwasher rack so as to accommodate various-sized freezer bags. The clip is slidably engageable with the hose and is configured to secure a plastic bag to the hose. The position of the clip is slidably adjustable relative to the hose so as to accommodate freezer bags of varying dimensions.

U.S. Pat. No. 5,794,792, issued on Aug. 18, 1998 to Convertino, provides a washing and drying rack for resealable bags. The apparatus has a base structure which contains an opening for allowing fluid to pass therethrough. A bag support structure extends from the base structure and is configured to support a plastic bag in such an orientation that the opening of the bag is in fluid communication with the opening of the base structure. The bag support structure is also configured to keep the opening of the bag open to permit a flow of fluid into and out of the bag. Clips or other retaining devices are also included for retaining the plastic bag on the support structure.

U.S. Pat. No. 6,367,492, issued on Apr. 9, 2002 to Brown, discloses an apparatus for retaining plastic bags during washing. The apparatus includes an open, segmented framework defining a form structure over which a soiled bag is positioned. First and second parallel frame sidewalls are laterally spaced-apart and interconnected such that the formed structure corresponds generally in size and shape to the interior of a plastic bag to be positioned thereover so that the form will maintain the bag in an open state. The framework includes a first or upper end and a second or lower end. The upper end is inserted into the open mouth of a soiled plastic bag. The upper end of the framework converges or tapers slightly to facilitate ease of insertion into the open mouth of a soiled plastic bag. The form is inserted into the bag until the mouth of the bag is seated around the second end of the framework. A plurality of bag retaining clips are located at the framework lower end to releasably receive and firmly retain peripheral portions of the bag at the mouth area during bag washing in a dishwasher.

U.S. Pat. No. 6,557,567, issued on May 6, 2003 to S. A. Mood, teaches a device for washing a reusable storage bag in a dishwasher. This device is formed by a frame assembly of one or more main bars joined with one or more connecting bars. Intersecting crossbars act both to spread open the bag and hold it for washing. The device has holes in the bottom of the main bar which allow it to be placed and secured onto any of the vertically-oriented branches of the dish trays common to conventional dishwashing machines. The device is designed to hold and spread the bag apart wide enough to allow the washing jets of a conventional dishwasher to reach the corners of the bag.

U.S. Pat. No. 6,640,982, issued on Nov. 4, 2003 to M. A. Bjerke, describes an adjustable plastic bag drying rack. This apparatus is comprised of a rectangularly-shaped tray having front and rear tine assemblies which are comprised of a laterally-oriented pivotally mounted tine bases. The inner portions of the tine bases are equipped with a plurality of bag tines that extend perpendicularly therefrom in a manner so that extend in a parallel fashion away from the center of rotation defined by the tine bases. The positions of the tine assemblies with respect to one another spaces the individual bag tines so that the distance between those positioned on the front tine assembly with respect to those on the rear tine assembly equals the width of the plastic storage bags to be dried.

U.S. Pat. No. 6,983,754, issued on Jan. 10, 2006 to Anderson et al., provides a bag washing apparatus and method. This apparatus has at least two vertically-extending support and restraining straps that may be engaged with like straps to form a resilient support framework. A plurality of mating dimples and protrusions offer controlled size adjustments, while maintaining the reliability of the structure. The structure is readily collapsible to a flat and compact structure prior to purchase and when not in use. The structure also includes a features to engage with the rack in the dishwasher to prevent the support and bag from being substantially relocated during the wash process.

U.S. Patent Publication No. 2012/0049014, published on Mar. 1, 2012 to the present inventor, shows an adjustable frame to support flexible bodies. This adjustable frame has a plurality of telescoping legs arranged in first and second pairs. Each leg of the first pair is rotatably coupled together and each leg of the second pair is rotatably coupled together. A scissor link mechanism coupled between the legs of the first and second pairs to vary a length of the plurality of legs in response to a distance between the first and second pairs.

It is an object of the present invention to provide a bag supporting apparatus that can suitably allow a flexible bag to be placed thereover so as to allow the bag to be washed in a dishwasher.

It is another object of the present invention to provide a bag supporting apparatus which can be adjustable to the interior dimensions of various sizes of plastic bags.

It is another object of the present invention to provide a bag supporting apparatus which can be easily folded into a small configuration for transport and storage.

It is still a further object of the present invention to provide a bag supporting apparatus which can be easily secured to a peg in a dishwasher rack.

It is still another object of the present invention to provide a bag supporting apparatus which allows the flexible bag to completely cleaned during the dishwashing process.

It is a further object of the present invention to provide a bag supporting apparatus that can serve as a drying rack for the bag after washing.

It is still another object of the present invention to provide a bag supporting apparatus which easy to use, easy to manufacture, and relatively inexpensive.

These and other objects and advantages of the present invention will become apparent from a reading of the attached specification and appended claims.

BRIEF SUMMARY OF THE INVENTION

The present invention is a bag support apparatus that comprises a first support member, a first arm slidably received in the first support member so as to be movable between a retracted position and an extended position, a second support member, and a second arm slidably received in the second support member so as to be movable between a retracted position and an extended position. The first arm is linked to the second arm such that a movement of the first support member toward the second support member causes the first and second arms to move toward the retracted position and such that a movement of the first support member away from the second support member causes and first and second arms to move to the extended position.

A scissor mechanism is linked to the first and second support members and to the first and second arms. This scissor mechanism includes a first scissor element having one end pivotally connected adjacent to a top of the first support member and an opposite end pivotally connected adjacent a lower end of the second arm, and a second scissor element having one end pivotally connected adjacent to a top of the second support member and an opposite end pivotally connected to a lower end of the first arm. The first scissor element is pivotally connected to the second scissor element generally at a center thereof.

The first support member has a first channel and a second channel extending in parallel relation. The first arm has a first rod slidably received in the first channel and a second rod slidably received in the second channel. The second support member has a first channel and a second channel extending in generally parallel relation. The second arm has a first rod slidably received in the first channel of the second support member and a second rod slidably received in the second channel of the second support member.

The first arm has a head formed at an upper end thereof. The second arm also has a head formed at an upper end thereof. Each of the heads includes a first member extending outwardly at an obtuse angle from one side of the arm and a second member extending outwardly at an obtuse angle from opposite side of the arm. A third member extends upwardly from an upper end from the first arm. The third member is positioned between the first and second members.

Each of the first and second support members has a base and a main body extending upwardly from the base. The base has a width greater than a width of the main body. Each of the first and second support members has at least one clip affixed adjacent to a bottom thereof. The clip is suitable for receiving an edge of the bag therein. In particular, the clip includes a first clip formed at one side of the support member, and a second clip formed at an opposite side of the support member. Each of the first and second clips has a surface juxtaposed against the side of the support member such that the bag can slide between the surface of the clip and the side of the support member and can be retained by the juxtaposed relation between the surface of the clip and the side of the support member. Each of the first and second clips has an upper edge flaring outwardly from the side of the support member.

At least one of the first and second support members has a retainer formed on an outer surface thereof. The retainer is suitable for receiving a peg of a dishwashing rack therein. The retainer is a tubular member having an end opening at a bottom of the support member.

The first support member has a slot formed along an inner surface thereof. The second scissor element is slidable along the slot as the first arm moves between the extended position and the retracted position. The second support member also has a slot formed along an inner surface thereof. The first scissor element is slidable along the slot as the second arm moves between the extended position and the retracted position. The first scissor element is pivotally connected at a fixed location at the upper end of the first support member. The second scissor element is pivotally connected at a fixed location at a top of the second support member. The opposite end of the second scissor element is affixed to at least one of the first and second rods of the first arm. The first scissor element is affixed to at least one of the first and second rods of the second arm.

The first arm has a bottom extending outwardly of a bottom of the first support member when in the retracted position.

The second arm has a bottom extending outwardly of a bottom of the second support member when in the retracted position. The first support member has an inner surface juxtaposed against an inner surface of the second support member when the first and second arms are in the retracted position. The first support member is adjustably connected to the second support member so as to fix a distance between the first and second support members.

This foregoing section is intended to describe generally the structure of the present invention. However, it is to be understood that variations in the structure of the present invention can be made within the scope of the present invention. As such, this section is not intended, an any way, as limiting of the scope of the present invention. The present invention should only be limited by the following claims and their legal equivalents.

DETAILED DESCRIPTION OF THE INVENTION

Figure 1:
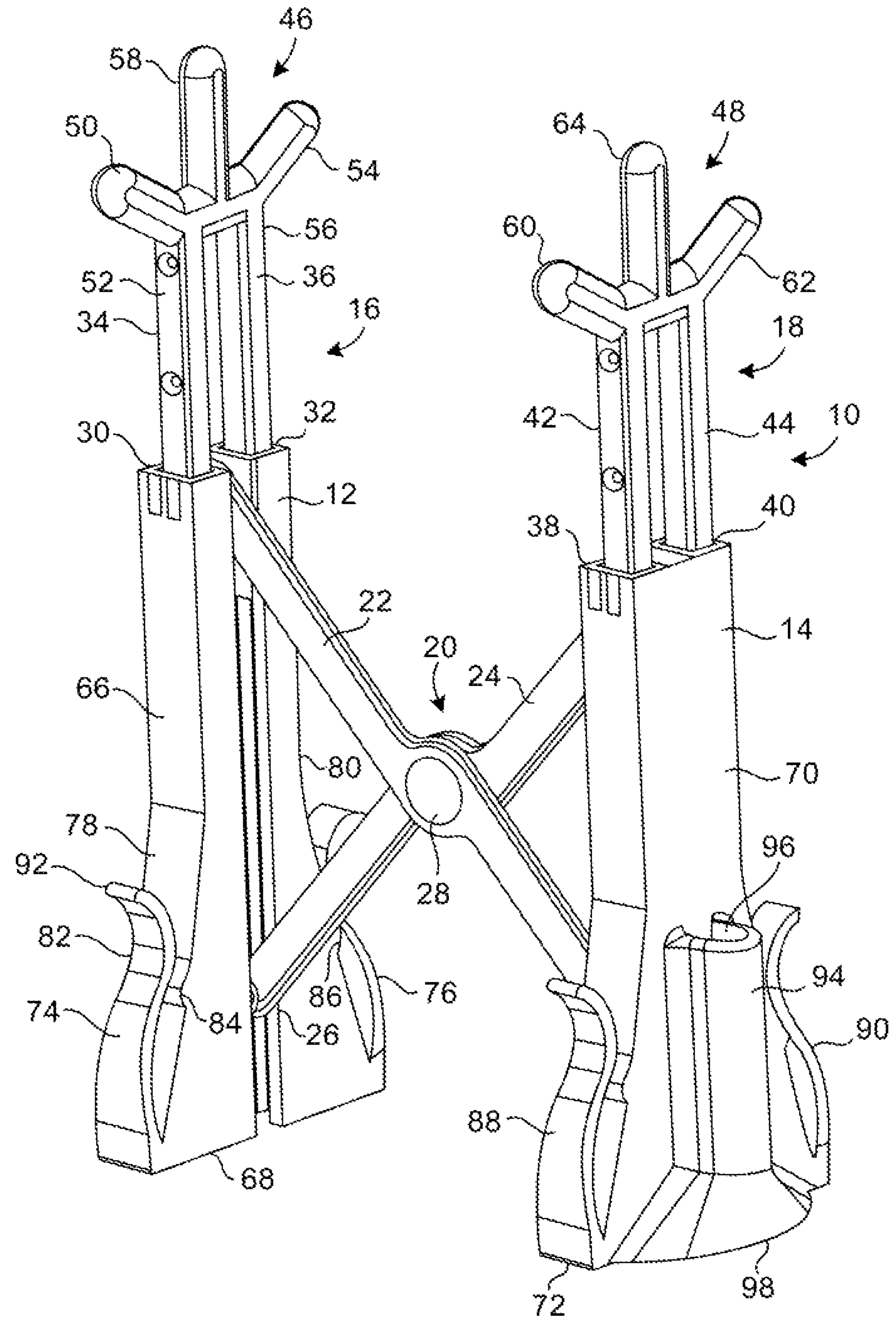
FIG. 1 is a perspective view the bag supporting apparatus of the present invention showing the bag supporting apparatus in an intermediate position.

Referring to FIG. 1, there is shown the bag supporting apparatus 10 in accordance with the preferred embodiment of the present invention. The bag supporting apparatus 10 includes a first support member 12, a second support member 14, a first arm 16 slidably received in the first support member 12 and a second arm 18 slidably received in the second support member 14. The first arm 16 is slidably received so as to be movable between a retracted position and an extended position. The second arm 18 is also slidably received in the second support member 14 so as to be movable between an extended position and a retracted position. The first arm 16 is linked to the second arm 18 such that a movement of the first support member 12 toward the second support member 14 causes the first arm 16 and the second arm 18 to move toward the retracted position and such that a movement of the first support member 12 away from the second support member 14 causes the first arm 16 and the second arm 18 to move to the extended position. In particular, in FIG. 1, the bag supporting apparatus 10 is shown in an intermediate position in which the arms 16 and 18 are in an intermediate position between the extended position and the retracted position.

In FIG. 1, it can be seen that there is a scissor mechanism 20 that is linked to the first support member 12 and to the second support member 14 and to the first arm 16 and the second arm 18. The scissor mechanism 20 includes a first scissor element 22 that has one end pivotally connected adjacent to a top of the first support member 12 and an opposite end (not shown) pivotally connected adjacent to a lower end of the second arm 18. A second scissor element 24 has one end pivotally connected adjacent to a top of the second support member 14 and an opposite end 26 pivotally connected to the lower end of the first arm 16. The first scissor element 22 is pivotally connected at 28 to the second scissor element 24 generally at the center thereof.

The first support member 12 has a first channel 30 and a second channel 32 extending in generally parallel relationship to each other. The first arm 16 has a first rod 34 slidably received in the first channel 30 and a second rod 36 slidably received in the second channel 32. The second support member 14 has a first channel 38 and a second channel 40 extending in generally parallel relationship. The second arm 18 has a first rod 42 slidably received in the first channel 38 and a second rod 44 slidably received in the second channel 40.

The parallel relationship of the rods 34 and 36 of the first arm 16 and the rods 42 and 44 of the second arm 18 provides structural integrity to the movement of the each of the arms 16 and 18. The parallel relationship of the respective rods assures that the movement of the arms 16 and 18 between the retracted and the extended position occurs evenly and consistently during the movement of the support members 12 and 14 toward and away from each other. As such, the respective channels 30, 32, 38 and 40 serve as guides for this movement. As such, regardless of the pressures applied to each of the arms 16 and 18, the arms will consistently and evenly move in the desired manner.

The first arm 16 has a head 46 formed at an upper end thereof. The second arm 18 also has a head 48 formed at an upper end thereof. The head 46 includes a first member 50 extending outwardly at an obtuse angle with respect to the side 52 of the rod 34. The second member 54 extends outwardly at an obtuse angle relative to the side 56 of the rod 36. The arrangement of the first member 50 and the second member 54 assures that the closed end of a bag placed thereon is maintained in a wide and open configuration. As such, any cleaning water from the dishwasher can fully wash the interior of the bag adjacent to the closed end of the bag. A third member 58 extends upwardly from the upper end of the arm 16 and is located between the first member 50 and the second member 54. The upper end of the third member 58 is intended to contact the closed end of the bag so as to assure the proper orientation and the opening of the bag at its closed end.

The head 48 of the second arm 18 also has a first member 60 and a second member 62 extending outwardly of the respective sides of the rods 42 and 44 at an obtuse angle. A third member 64 extending upwardly between the first member 60 and the second member 62 at the end of the arm 18. As such, the heads 46 and 48 will be symmetrical and correspond with each other during the extension and retraction of the respective arms 16 and 18.

The first support member 12 includes a main body portion 66 and a base 68. The base 68 is located at the bottom of the main body portion 66. The base 68 will have a width greater than the width of the main body portion 66 so as to provide stability for the first support member 12 when it is placed upon an underlying surface and to provide an appropriate opening for the supported bag when being washed and/or dried. Similarly, the second support member 14 also has a main body portion 70 and a base 72. Base 72 has a width greater than the width of the main body portion 70 and corresponds in planar relationship with the base 68 of the first support member 12.

The first support member 12 has a first clip 74 and a second clip 76 formed on the respective sides 78 and 80 of the support member 12. The clips 74 and 76 are suitable for receiving an edge of the bag therein. The first clip 74 is formed on the side 78 of the main body portion 66 of the first support member 12. The clip 76 is formed on the side 80 of the main body portion 66 of the first support member 12. Each of the clips 74 and 76 will have a surface 82 that is juxtaposed against respective sides of the first support member 12. In particular, a protrusion 84 is formed on the side 78 so as to generally contact the inner surface of the clip 74. As such, this provides an area whereby the side of the bag can slide therebetween and whereby the clip 74 can securely retain the edge of the bag within the interior of the clip 74. Similarly, clip 76 also contacts a protrusion 86 so as to retain another edge of the bag therein. The second support member 14 also includes clips 88 and 90. Clips 88 and 90 have a similar construction and arrangement to that of clips 74 and 76. As such, any bag that is placed over the support members 12 and 14 will be securely retained by the clips 74, 76, 88 and 90 at four points in a secure manner. The strength of the respective clips should be suitable for withstanding any forces that may be imparted by the jets of water of the dishwasher. Each of the clips 74, 76, 88 and 90 includes an upper edge 92 which flares outwardly from the respective sides of the support members 12 and 14. This outwardly flaring edge of the respective clips serves as a guide or funnel whereby the edges of the flexible bag can be introduced into the area between the clips and the support members.

A retainer 94 is illustrated as formed on the side of the second support member 14. The retainer 94 is in the nature of a tubular member having an interior passageway 96. The interior passageway 96 should have a diameter suitable for allowing a peg of a dishwashing rack to be introduced therein. The bottom 98 of the retaining 94 flares outwardly so as to serve as a guide or funnel whereby the peg of the dishwashing rack can be easily introduced into the interior passageway 96 of the retainer 94. The retainer 94 can be formed on one of the support members 12 and 14 or on both of the support members.

Figure 2:
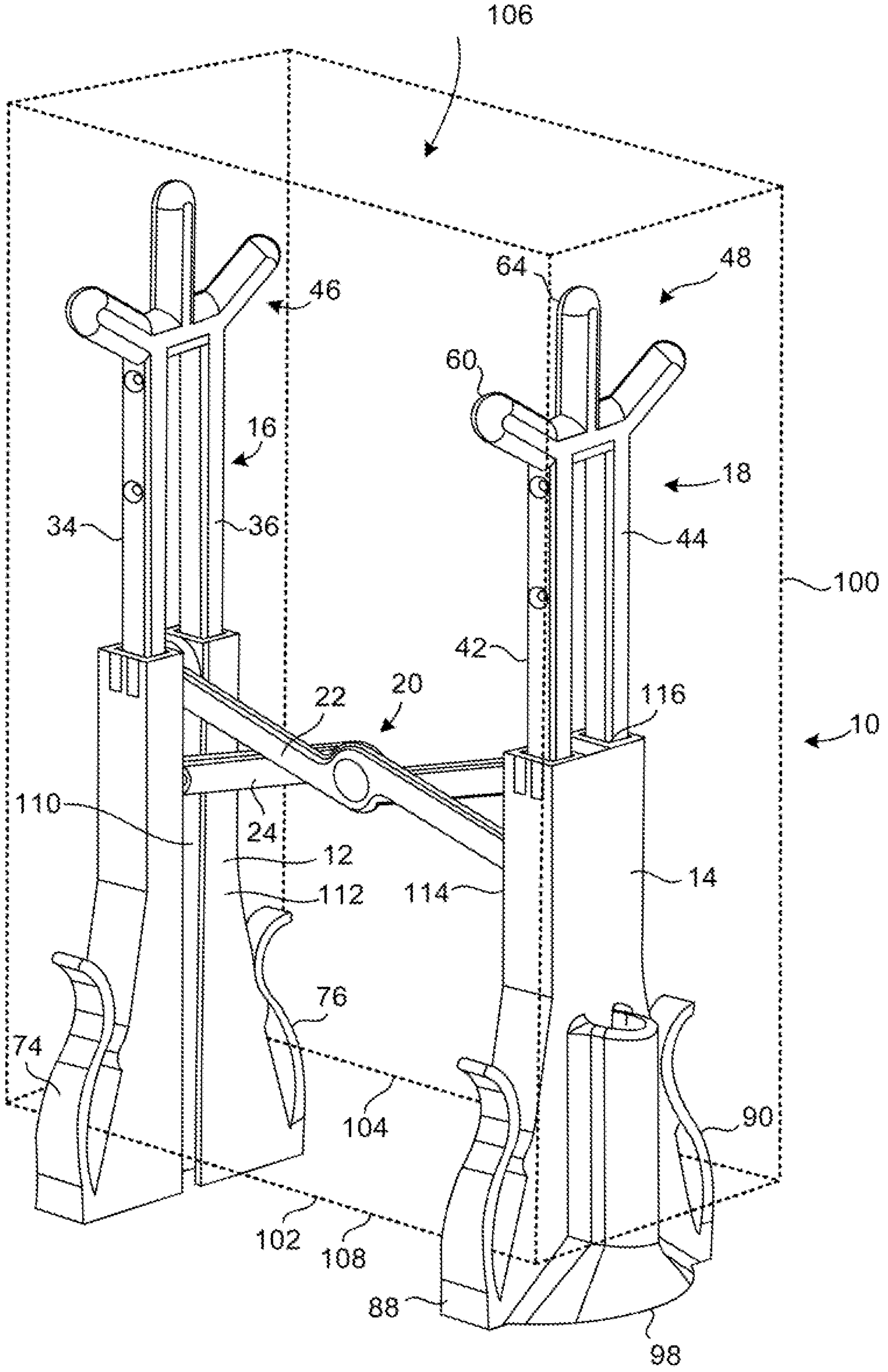
FIG. 2 is a perspective view of the bag supporting apparatus of the present invention showing the bag supporting apparatus in an extended position with a broken line illustration of a bag positioned thereon.

FIG. 2 is an illustration showing a flexible bag 100 (in broken line fashion) as applied over the respective arms 16 and 18 and over the respective support members 12 and 14 of the bag supporting apparatus 10 of the present invention. In particular, the lower edges 102 and 104 of the flexible bag 100 are securely retained by the respective clips 74, 76, 88 and 90 generally at the bottom to the support members 12 and 14. The interior surfaces of each of the clips exerts a force against the respective protrusions on the sides of the support members 12 and 14 so as to securely retain the edges 102 and 104 in their proper positions.

The arms 16 and 18 are illustrated in their fully extended position. As a result, the support members 12 and 14 will be fixed at their maximum distance therebetween. The simple movement of the support members 12 and 14 away from each other causes the scissor mechanism 20 to cause each of the arms 16 and 18 to move upwardly to the extended position. The respective heads 46 and 48 are arranged so as to contact the closed end 106 of the flexible bag 100 so as to maintain this closed end 106 in a broadly open configuration. As such, water entering through open end 108 at the bottom of the flexible bag 100 can easily penetrate through the interior of the flexible bag 100 and remove material at the closed end 106.

As can be seen in FIG. 2, the scissor element 22 is pivotally connected to the support member 12. A slot 110 extends along the inner surface 112 of the first support member 12. The first scissor element 22 has its pivotal end in the space of the slot 110. The pivotal end of the scissor element 22 has a fixed location at the upper end of the support member 12. The second scissor element 24 is pivotally connected to at least one of the rods 34 and 36 of the arm 16. As such, as the scissor element 24 scissors by the movement of the first support member 12 away from the second support member 14, the end of the second scissor element 24 will drive the first arm 16 upwardly. A similar action will occur with respect to the second arm 18. In other words, the second support member 14 will also have a slot (not shown) corresponding to slot 110. The end 114 of the first scissor element 22 is joined at least one of the rods 42 and 44 of the second arm 18. As such, it will drive the arm 18 upwardly in correspondence with the upper movement of the arm 16. The end 116 is pivotally mounted in a fixed location at the upper end of the second support member 14.

Figure 3:
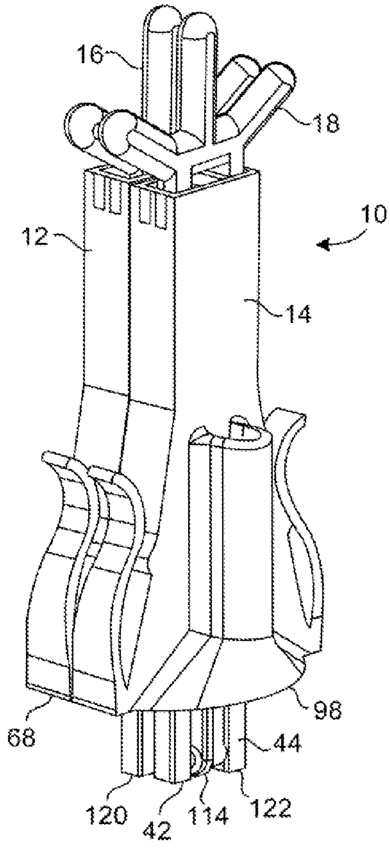
FIG. 3 is a perspective view showing the bag supporting apparatus of the present invention in the retracted position.

FIG. 3 shows the bag supporting apparatus 10 of the present invention with the arms 16 and 18 in their retracted position. In this configuration, the first support member 12 will have its inner support juxtaposed against the inner support of the second support member 14. As can be seen in conjunction with FIG. 2, because of the scissoring action caused by the scissor mechanism 20, the respective ends of the scissor elements 24 and 22 will draw each to the arms 16 and 18 downwardly into the interior of the support members 12 and 14. The bottom end 120 of the arm 16 will extend outwardly of the base 68 of the first support member 12. Similarly, the bottom 122 of the second arm 18 will extend outwardly of the base 98 of the second support member 14. The respective slots 110 on the inner surfaces of each of the support members 12 and 14 will allow each of the scissor elements 22 and 24 to be received therein such that the support members 12 and 14 can be juxtaposed against each other.

In FIG. 3, it can be seen that end 114 of the first scissor element 22 is pivotally affixed between the rods 42 and 44 of the arm 18. As such, the respective arms 16 and 18 can be easily moved to the retracted position (as illustrated in FIG. 3).

The configuration illustrated in FIG. 3 shows the bag supporting apparatus 10 in its retracted position. As can be seen, the bag supporting apparatus 10 assumes a neat and small configuration when in the retracted position. As such, the bag supporting apparatus 10 can be easily stowed and transported. Additionally, in this retracted position, the bag supporting apparatus 10 can be easily and conveniently displayed in blister packaging. A maximum number of such bag supporting apparatus can be delivered in a relatively small package. The ability to separate the support members 12 and 14 and extend the arms 16 and 18 allows the bag supporting apparatus 10 to adapt to various of sizes of bags. In FIG. 2, a one gallon plastic bag is shown. However, by moving the bag supporting apparatus to the arrangement shown in FIG. 1, a smaller bag, such as a one quart bag, can be placed onto the bag supporting apparatus 10. Additionally, any other intermediate sizes of bags can also be accommodated by the bag supporting apparatus of the present invention.

Figure 4:
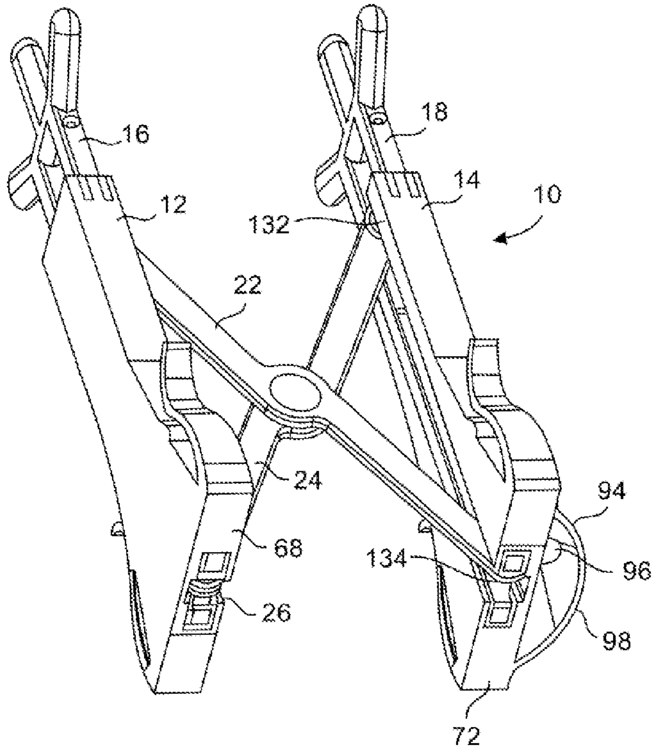
FIG. 4 is a bottom perspective view of the bag supporting apparatus of the present invention.

FIG. 4 of the bag supporting apparatus 10 of the present invention. In particular, in FIG. 4, the bases 68 and 72 of each of the support members 12 and 14 is illustrated. Additionally, the channel 130 formed on the inside surface 132 of the second support member 14 is illustrated. The bottom of the retainer 94 is shown as flaring outwardly at bottom 98. As such, the retainer 94 can act as a funnel so that the bag supporting apparatus 10 can be applied onto a peg of a dishwashing rack. The peg can enter the bottom 98 of the retainer 94 and enter the interior passageway 96 in a fast, convenient and secure manner.

FIG. 4 shows that the scissor element 24 has its end 26 pivotally connected to the bottom of the first arm 16. Similarly, the scissor element 22 is illustrated as having its bottom 134 pivotally connected to the second arm 18.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A bag support apparatus comprising:

a first support member;

a first arm slidably received in said first support member so as to be movable between a retracted position and an extended position;

a second support member; and a second arm slidably received in said second support member so as to be movable between a retracted position and an extended position, said first arm being linked to said second arm such that a movement of said first support member toward said second support member causes said first and second arms to move toward the retracted position and such that a movement of said first support member away from said second support member causes said first and second arms to the extended position, said first support member having a first channel and a second channel extending in parallel relationship, said first arm having a first rod slidably received in said first channel and a second rod slidably received in said second channel, said second support member having a first channel and a second channel extending in parallel relation, said second arm having a first rod slidably received in said first channel of said second support member and a second rod slidably received in said second channel of said second support member.

2. The bag supporting apparatus of claim 1, further comprising:

a scissor mechanism linked to said first and second support members and to said first and second arms.

3. The bag supporting apparatus of claim 2, said scissor mechanism comprising:

a first scissor element having one end pivotally connected adjacent to a top of said first support member and an opposite end pivotally connected adjacent a lower end of said second arm; and a second scissor element having one end pivotally connected adjacent to a top of said second support member and an opposite end pivotally connected to a lower end of said first arm, said first scissor element pivotally connected to said second scissor element generally at a center thereof.

4. The bag supporting apparatus of claim 1, said first arm having a head formed at an upper end thereof, said second arm having a head formed at an upper end thereof.

5. The bag supporting apparatus of claim 4, each of the heads comprising:

a first member extending outwardly at an obtuse angle from one side of the arm; and a second member extending outwardly at an obtuse angle from opposite side of the arm.

6. The bag supporting apparatus of claim 5, further comprising:

a third member extending upwardly from an upper end from said first arm, said third member positioned between said first and second members.

7. The bag supporting apparatus of claim 1, each of said first and second support members having a base and a main body extending upwardly from said base, said base having a width greater than a width of said main body.

8. A bag support apparatus comprising:

a first support member;

a first arm slidably received in said first support member so as to be movable between a retracted position and an extended position;

a second support member; and a second arm slidably received in said second support member so as to be movable between a retracted position and an extended position, said first arm being linked to said second arm such that a movement of said first support member toward said second support member causes said first and second arms to move toward the retracted position and such that a movement of said first support member away from said second support member causes said first and second arms to the extended position, each of said first and second support members having at least one clip affixed adjacent to a bottom thereof, the clip suitable for receiving an edge of the bag therein.

9. The bag supporting apparatus of claim 8, the clip comprising:

a first clip formed at one side of the support member; and a second clip formed at an opposite sides of the support member, each of said first and second clips having a surface juxtaposed against the side of the support member such that the bag can slide between the surface of the clip and the side of the support member and can be retained by the juxtaposed relation between the surface of the clip and the side of the support member.

10. The bag supporting apparatus of claim 9, each of said first and second clips having an upper edge flaring outwardly from the side of the support member.

11. A bag support apparatus comprising:

a first support member;

a first arm slidably received in said first support member so as to be movable between a retracted position and an extended position;

a second support member; and a second arm slidably received in said second support member so as to be movable between a retracted position and an extended position, said first arm being linked to said second arm such that a movement of said first support member toward said second support member causes said first and second arms to move toward the retracted position and such that a movement of said first support member away from said second support member causes and first and second arms to the extended position, at least one of said first support member and said second support member having a retainer formed on an outer surface thereof, the retainer suitable for receiving a peg of a dishwashing rack therein.

12. The bag supporting apparatus of claim 11, the retainer being a tubular member having an end opening at a bottom of the support member, said end having a diameter that is greatest at said bottom support member.

13. A bag support apparatus comprising:

a first support member;

a first arm slidably received in said first support member so as to be movable between a retracted position and an extended position;

a second support member; and a second arm slidably received in said second support member so as to be movable between a retracted position and an extended position, said first arm being linked to said second arm such that a movement of said first support member toward said second support member causes said first and second arms to move toward the retracted position and such that a movement of said first support member away from said second support member causes and first and second arms to the extended position, said first support member having a slot formed along an inner surface thereof, said second scissor element being slidable along said slot as said first arm moves between the extended position and the retracted position, said second support member having a slot formed along an inner surface thereof, said first scissor element being slidable along said slot as said second arm moves between the extended position and the retracted position.

14. The bag supporting apparatus of claim 13, said first scissor element being pivotally connected at a fixed location at said upper end of said first support member, said second scissor element being pivotally connected at a fixed location at a top of said second support member.

15. The bag supporting apparatus of claim 1, said first arm having a bottom extending outwardly of a bottom of said first support member when in the retracted position, said second arm having a bottom extending outwardly of a bottom of said second support member when in the retracted position.

16. The bag supporting apparatus of claim 1, said first support member having an inner surface juxtaposed against an inner surface of said second support member when said first and second arms are in the retracted position.

17. The bag supporting apparatus of claim 1, said first support member being adjustably connected to said second support member so as to fix a distance between said first and second support members.

* * * * *